United States Patent [19]

Hayashi

[11] Patent Number: 6,115,089
[45] Date of Patent: Sep. 5, 2000

[54] ACTIVE-MATRIX TYPE LIQUID CRYSTAL DISPLAY DEVICE

[75] Inventor: Hisaaki Hayashi, Hyogo-ken, Japan

[73] Assignee: Kabushiki Kaisha Toshiba, Kawasaki, Japan

[21] Appl. No.: 09/069,247

[22] Filed: Apr. 29, 1998

[30] Foreign Application Priority Data

May 19, 1997 [JP] Japan ..................................... 9-128671

[51] Int. Cl.⁷ ................................................ G02F 1/1343
[52] U.S. Cl. ............................................................ 349/39
[58] Field of Search ........................................ 349/39, 38

[56] References Cited

U.S. PATENT DOCUMENTS

| | | | |
|---|---|---|---|
| 5,151,805 | 9/1992 | Takeda et al. | 349/39 |
| 5,187,602 | 2/1993 | Ikeda et al. | 349/39 |
| 5,459,596 | 10/1995 | Ueda et al. | 349/39 |
| 5,657,139 | 8/1997 | Hayashi . | |
| 5,691,786 | 11/1997 | Nakai | 349/39 |
| 5,831,708 | 11/1998 | Hiraishi et al. | 349/39 |

OTHER PUBLICATIONS

Hori, H., "Key Issues Regarding High–Information–Content TFT–LDCs for Data Graphics", Proceedings of the SID, vol. 32/4, 1991, pp. 331–337.

Primary Examiner—James A. Dudek
Attorney, Agent, or Firm—Pillsbury Madison & Sutro LLP

[57] ABSTRACT

A liquid crystal display device includes an array substrate provided with pixel electrodes and a counter electrode provided opposite to the array substrate, and a liquid crystal layer held between the array and counter substrates. The liquid crystal layer, and the array and counter electrode define a liquid crystal capacitor. The array substrate disposed on an insulation substrate includes a plurality of signal and scanning lines crossing each other. A thin film transistor is provided in the vicinity of each crossing point. The thin film transistor is connected to the pixel electrode. A storage capacitance is defined between the pixel electrode and a storage capacitance line. A parasitic capacitance is further defined between the pixel electrode and the signal line. The parasitic capacitance is 4% or less of an entire pixel capacitance including the liquid crystal, storage and parasitic capacitance in order to avoid crosstalk between the pixels.

4 Claims, 5 Drawing Sheets

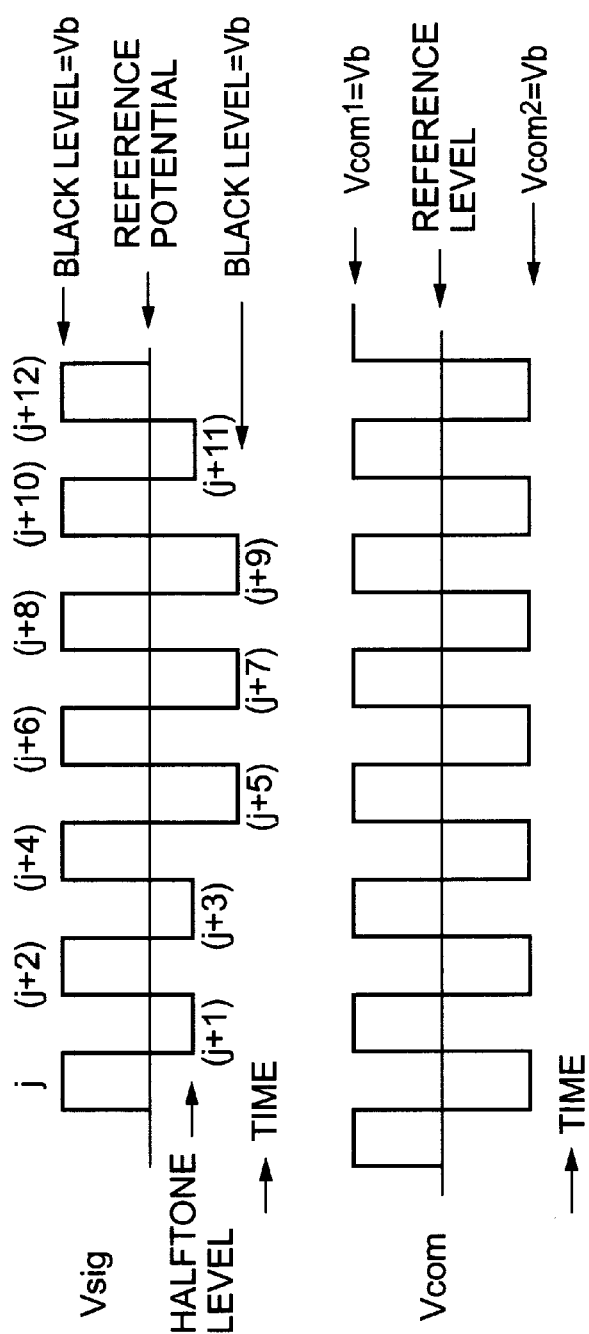
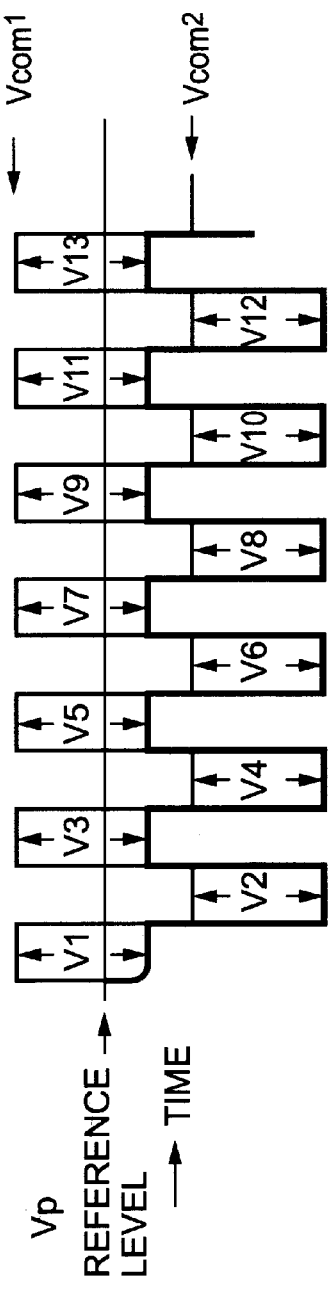
FIG.8A  FIG.8B  FIG.8C

ACTIVE-MATRIX TYPE LIQUID CRYSTAL DISPLAY DEVICE

BACKGROUND OF THE INVENTION

Field of the Invention

This invention relates to an active-matrix type liquid crystal display device and, more particularly, an active-matrix type liquid crystal display device with an array substrate including three-terminal non-linear switching elements connected to pixel electrodes.

An active-matrix type liquid crystal display device (called hereinafter the "AM LCD") includes array and counter substrates with alignment layers on opposite surfaces, respectively, and a liquid crystal composition held between the substrates. A plurality of signal and scanning lines are disposed on the array substrate in a matrix form. Thin film transistors (herein after called "TFTs") are formed in the vicinities of cross points of the signal and scanning lines as three-terminal non-linear switching elements, respectively. Pixel electrodes made of indium tin oxide (hereinafter called the "ITO") are also provided in those vicinities.

Light blocking layers are provided on a glass substrate of the counter substrate in a matrix form to prevent incident light from coming from the vicinities of pixel electrodes. Counter electrodes made of ITO are disposed on the light blocking layers through insulation layers.

The signal and scanning lines are electrically connected to a driver circuit board through polyimide flexible printed circuit boards on which metal wiring is formed or flexible printed circuit boards on which active elements are provided by tape automated bonding or the like.

The counter electrode is conducted to the array substrate through transfers made of resins into which conductive particles such as silver ones are dispersed. The counter electrode is further electrically connected to the driver circuit board through the flexible printed circuit boards.

Generally, crosstalk images are seldom caused in the AM LCD set forth above but occur once in a while.

When a black or white window pattern, for instance, is displayed on a halftone raster background in such a driving method that the polarity of a voltage applied to pixel electrodes is reversed every signal line with respect to a reference potential, crosstalk components appear at the upper and lower portions of the window pattern. This phenomenon results from leakage currents flowing through the TFTs and the potential of a pixel electrode approaching that of a signal line. The capacitance value of a storage capacitor is designed to be larger to avoid the crosstalk images in the longitudinal direction of the display.

In the driving method where the voltage applied to the liquid crystal is changed every scanning line in polarity with respect to a reference potential, when a black or white window pattern is displayed on a halftone raster background, crosstalk components appear on the right and left sides of the window pattern. This is caused by potential fluctuations at the counter electrode or the storage capacitor, i.e., fluctuations of the voltage applied to the liquid crystal. As one of the measures to obtain good display images without such lateral crosstalk components, resistance values of the counter electrode and storage capacitor lines are made small to perform the potential polarity inversion quickly.

Highly functional software, such as WINDOWS (a registered trademark owned by Microsoft Corp.) Version 3.1 or WINDOWS 95, has been developed for personal computers to perform more efficiently and is widely used at the present. The software makes it easily possible to display sophisticated patterns which were impossible to be made in the past.

In the driving method of AM LCDs where potentials at the counter electrode and at the storage capacitor lines are changed every scanning line and the polarities of voltages applied to the liquid crystals are inverted in response thereto, when a window pattern based on the advanced performance software is displayed on a background consisting alternatively of black and halftone pixels at each scanning line, crosstalk images appear at the upper and lower portions of the window pattern in spite of the AM LCDs with the crosstalk prevention measure mentioned above.

SUMMARY OF THE INVENTION

An object of the present invention is to overcome such crosstalk images and is to provide AM LCDs which are capable of displaying sophisticated, good quality images without substantial crosstalk images.

AM LCDs of this invention include an array substrate with pixel electrodes, a counter substrate provided opposite thereto and a liquid crystal material held between the array and counter substrates. The array substrate has an insulation substrate, a plurality of signal and scanning lines which cross each other and are formed on the insulation substrate, switching elements provided in the vicinities of the crossing points of the lines, pixel electrodes connected to the switching elements, and storage capacitor lines defined storage capacitors together with the pixel electrodes. A parasitic capacitance defined between the signal line and the pixel electrode is 4% (four percent) of a total pixel capacitance or less.

More preferably, the parasitic capacitance is 3% (three percent) of the total pixel capacitance or less. When the ratio is, however, more than 4% (four percent), a potential change at the signal line is supplied to a pixel through the parasitic capacitor and a potential level shift of the pixel resulting therefrom is large. As a result, the crosstalk images appear when the sophisticated pattern is displayed.

The total pixel capacitance is the sum of the liquid crystal capacitance defined between the pixel electrode and the counter substrate; the storage capacitance; the capacitance formed by the electrode of the switching element, the scanning line, and the insulation layer provided between the electrode and the scanning line; and the parasitic capacitance defined between the pixel electrode and the signal line.

AM LCDs of this invention perform effectively where driving potentials at the counter electrode and the storage capacitor line are inverted every scanning line and the polarity of a voltage applied to the liquid crystal is also inverted at the same rate with respect to a reference potential.

Measures for making the parasitic capacitance 4% or less of the total pixel capacitance are as follows:

(1) The length of the pixel electrode edge overlapped with the storage capacitor is designed to be longer.
(2) The distance between the signal line and the pixel electrode is also designed to be longer;
(3) The capacitance of the storage capacitor is designed to be greater.
(4) The capacitance of a capacitor defined between the pixel electrode and the counter electrode is also designed to be greater.

With those structures, the parasitic capacitance can be suppressed to be 4% or less of the total pixel capacitance in the AM LCDs of the present invention so that a level shift of the pixel potential resulting from potential changes at the signal line becomes quite small. As a result, no substantial crosstalk images appear at the upper and lower portions of a window pattern in such complicated background images as those alternatively consisting of black and halftone pixels every scanning line so that the AM LCD can be provided to display a high dignity image.

The above-stated and other objects and technical features of the present invention will become apparent from the following description when taken with the accompanying drawings. It will be understood, however, that the drawings are for purposes of illustration and are not to be construed as defining the scope of the invention, reference being had for the latter purpose to the claims appended hereto.

BRIEF DESCRIPTION OF THE DRAWINGS

FIGS. 8A through 8C are waveforms of signal, common and pixel voltages applied to a signal line, a common electrode and a pixel electrode, respectively.

DESCRIPTION OF THE PREFERRED EMBODIMENT

An AM LCD according to one embodiment of the present invention will be described with reference to the drawings. The AM LCD is composed of a panel with SVGA pixels and a 12.1" diagonal length display area.

Figure 1:
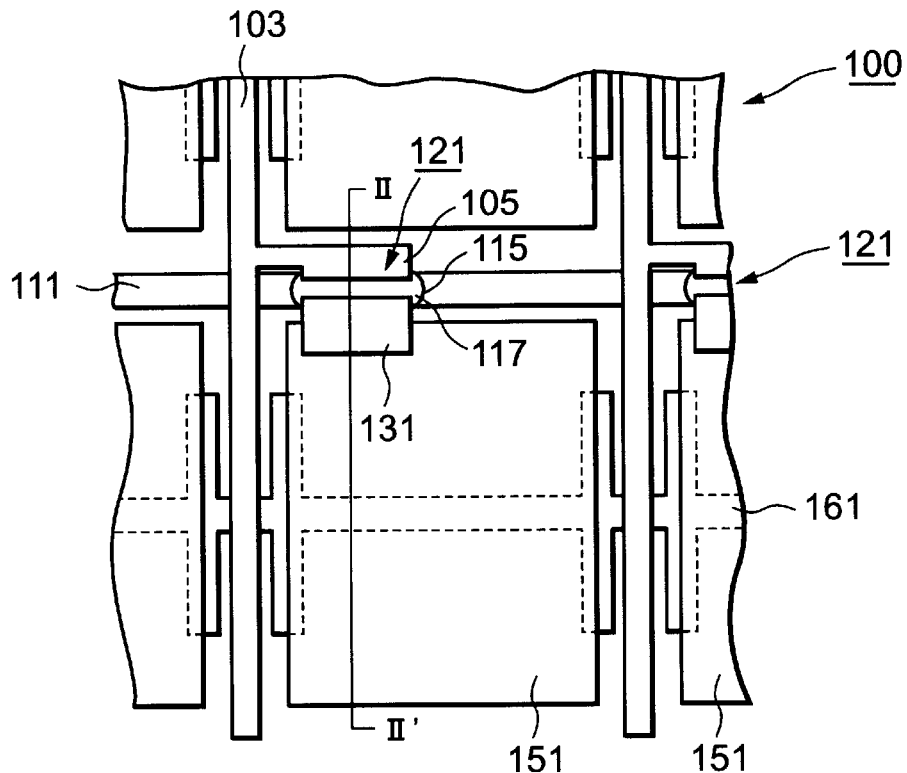
FIG. 1 is a plan view of an array substrate of an AM LCD according to the present invention.
Figure 2:
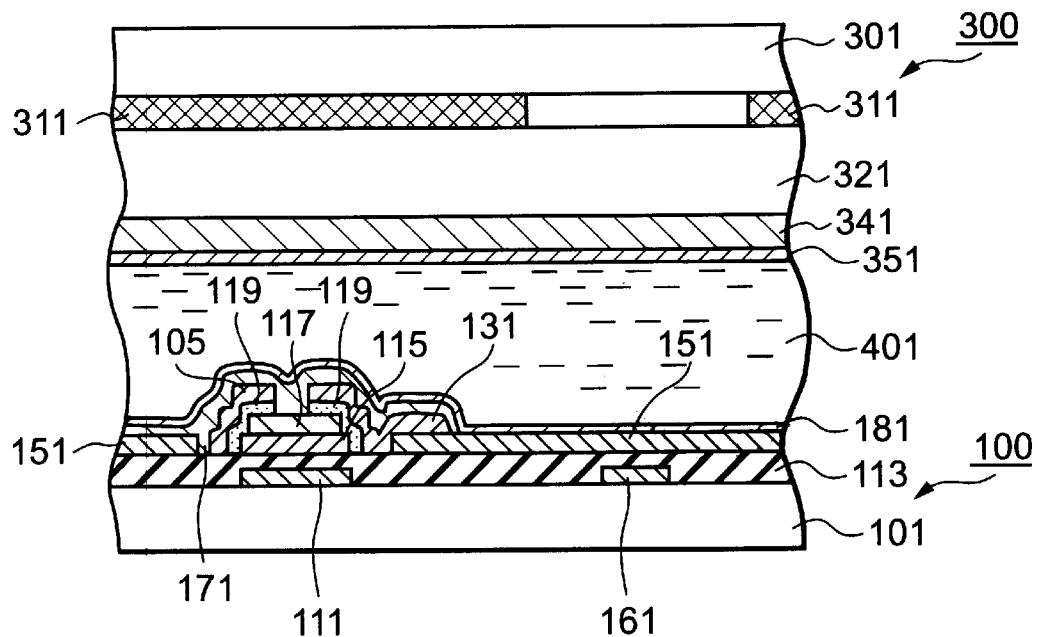
FIG. 2 is a sectional view of a counter substrate, a liquid crystal layer and the array substrate taken along the line II–II' shown in FIG. 1.

FIG. 1 shows a partial layout on an array substrate in the AM LCD. FIG. 2 is a sectional view taken along the line II–II' in the layout.

As shown in FIGS. 1 and 2, a TFT 121 is disposed in the vicinity of a cross point of signal and scanning lines 103 and 111 formed on a glass substrate 101. The TFT 121 is provided with a gate electrode, a gate insulation layer 113 and an amorphous semiconductor layer 115. The gate electrode consists of a part of the scanning line 103. The gate insulation layer 113 is made of silicon oxide and silicon nitride layers laminated on the gate electrode. The semiconductor layer 115 is intrinsic or non-doped. Further, a channel protection film or etching stopper 117 made of silicon nitride is provided on the semiconductor layer 115 in a self-alignment with the scanning line 111.

The semiconductor layer 115 is connected to a pixel electrode 151 through a low resistance layer 119 of an n+ type a-Si:H and a source electrode. The semiconductor layer 115 is also connected to the signal line 103 through a low resistance layer 119 and a drain electrode 105.

A storage capacitor line 161 is disposed along the scanning line 111 and is overlapped with the pixel electrode 151. A storage capacitor Cs (FIG. 6) is defined between the pixel electrode 151 and the storage capacitor line 161. A silicon nitride protection layer 171 is further provided on the signal line 103, the scanning line 111, and the TFT 121.

An alignment layer 181 is coated on the surface of the array substrate described above. The alignment layer 181 on the display area is subject to a rubbing process. The counter substrate 300 is provided opposite to a array substrate with the gap of 5 μm. A liquid crystal material 401 is held between the array and counter substrates 100 and 300. A light blocking layer 311 and a color filter 321 with red (R), green (G) and blue (B) color elements are formed on a transparent glass substrate 301, for example, of the counter substrate 300. A counter electrode 341 made of ITO and an alignment layer 351 are further laminated in turn thereon.

The light blocking layers 311 are provided in matrix to prevent light from passing through one gap between the signal line 103 and the pixel electrode 151, and the other between the scanning line 111 and the pixel electrode 151. The light blocking layers 311 are made of chromium oxide and chromium lamination layers.

Figure 3:
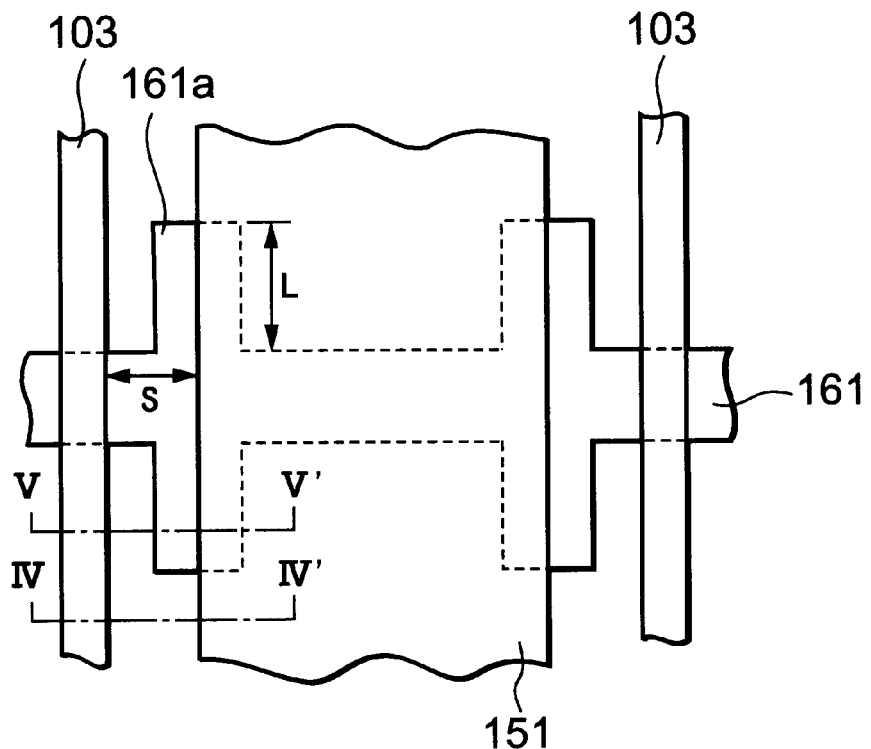
FIG. 3 is a partial plan view of the AM LCD according to the present invention.

An equivalent circuit of one pixel in the AM LCD will be explained hereinafter. FIG. 3 is an enlarged plan view of the storage capacitor portion of the AM LCD shown in FIGS. 1 and 2. As shown in FIG. 3, the signal lines 103 and the pixel electrode 151 are disposed in parallel and the storage capacitor line 161 is provided across the signal lines 103 and the pixel electrode 151. The storage capacitor line 161 extends in a perpendicular direction to the signal lines 103 but has portions 161a extending in parallel therewith and along the side edges of the pixel electrode 151 (the opposite sides to the signal lines 103).

Figure 4:
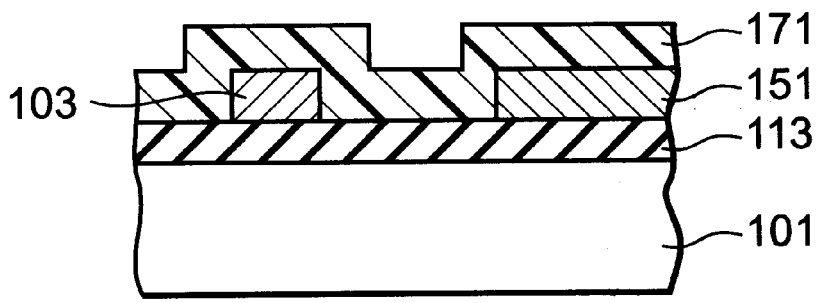
FIG. 4 is a sectional view taken along the line IV–IV' of the AM LCD shown in FIG. 3.
Figure 5:
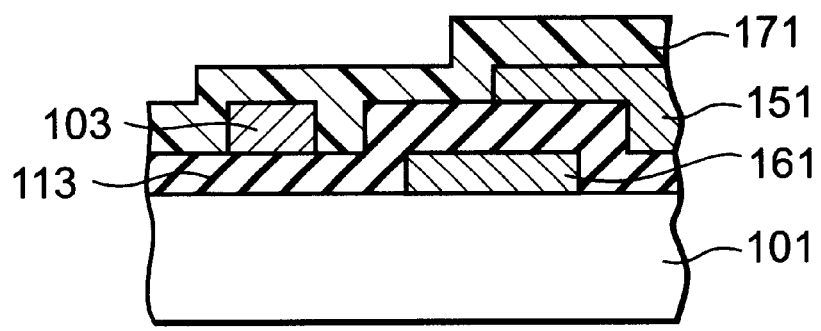
FIG. 5 is a sectional view taken along the line V–V' of the AM LCD shown in FIG. 3.

The pixel electrode 151 has one portion overlapped with the storage capacitor line 161 and another portion not overlapped therewith. The former and the latter taken along the lines IV–IV' and V–V' in FIG. 3 are shown in FIGS. 4 and 5, respectively.

A simulation and an experimental analysis have revealed that electric flux lines caused between the signal line 103 and pixel electrode 151 pass mainly through the glass substrate 101. The storage capacitor line 161 shields the electric flux lines passing through the glass substrate 101 where the storage capacitor line 161 is provided under the side edge of the pixel electrode 151 as shown in FIG. 5. A parasitic capacitance Cpsig defined between the signal line 103 and the pixel electrode 151 with the structure shown in FIG. 5 is 1/10 as large as in the case where no pattern of the storage capacitor line 161 is provided under the side edge of the pixel electrode 151 as shown in FIG. 4.

Where the length "L" is a length of the pixel electrode 151 extending in parallel with the signal line 103, the distance "S" is a distance between the pixel electrode 151 and the signal line 103, and the coefficient "A" is a capacitance coefficient between the pixel electrode 151 and the signal line 103, a parasitic capacitance Cpsig made between the pixel electrode 151 and the signal line 103 is given by the following:

$$Cpsig = A \times L/S$$

Since the pixel electrode 151 is capacitively coupled with the signal line 103 in a conventional AM LCD, the coefficient "A" is experimentally given:

$$A = 0.22 \text{ (fF)}$$

Figure 6:
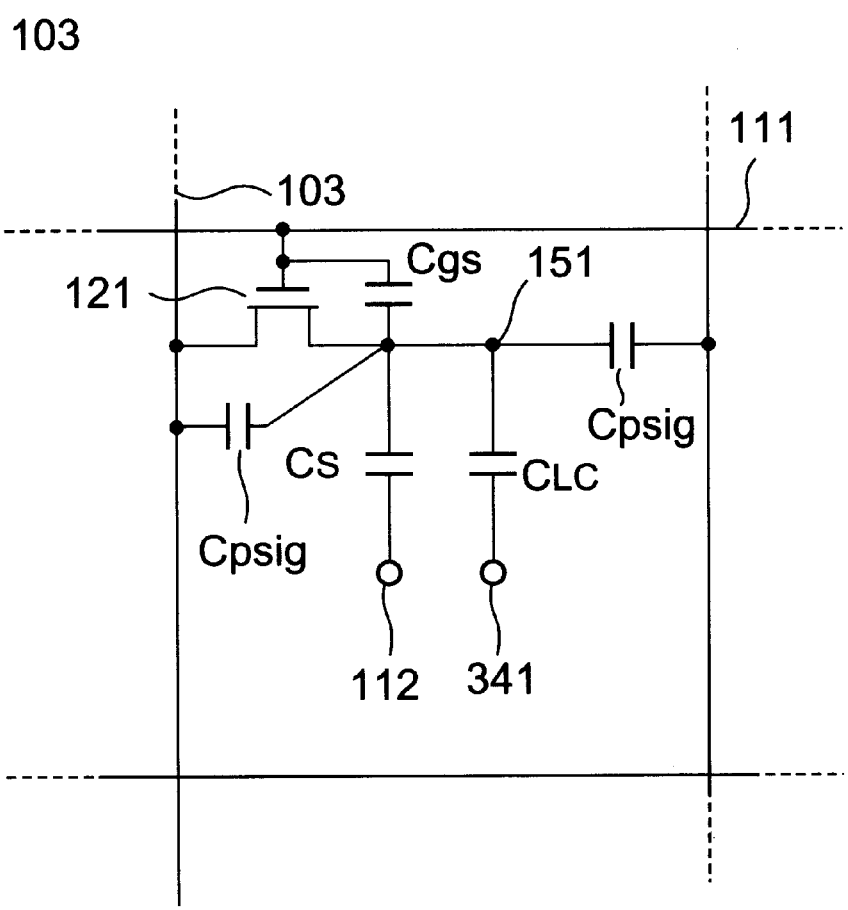
FIG. 6 is an equivalent circuit of a pixel in the AM LCD.

FIG. 6 is an equivalent circuit of a pixel portion in the AM LCD. An entire capacitance Cpall of the pixel portion is the sum of a liquid crystal capacitance CLc consisting of the pixel and counter electrode and the liquid crystal material held between the electrodes, the storage capacitance Cs, the parasitic capacitance Cpsig, and a parasitic capacitance Cgs defined between the gate and source electrodes. Namely, the total capacitance Cpall can be expressed by the following equation:

$$Cpall=CLc+Cs+Cpsig+Cgs$$

It is noted, however, that the liquid crystal capacitance CLc is defined as a capacitance of a middle level between white and black displays because it has voltage dependency.

Figure 7:
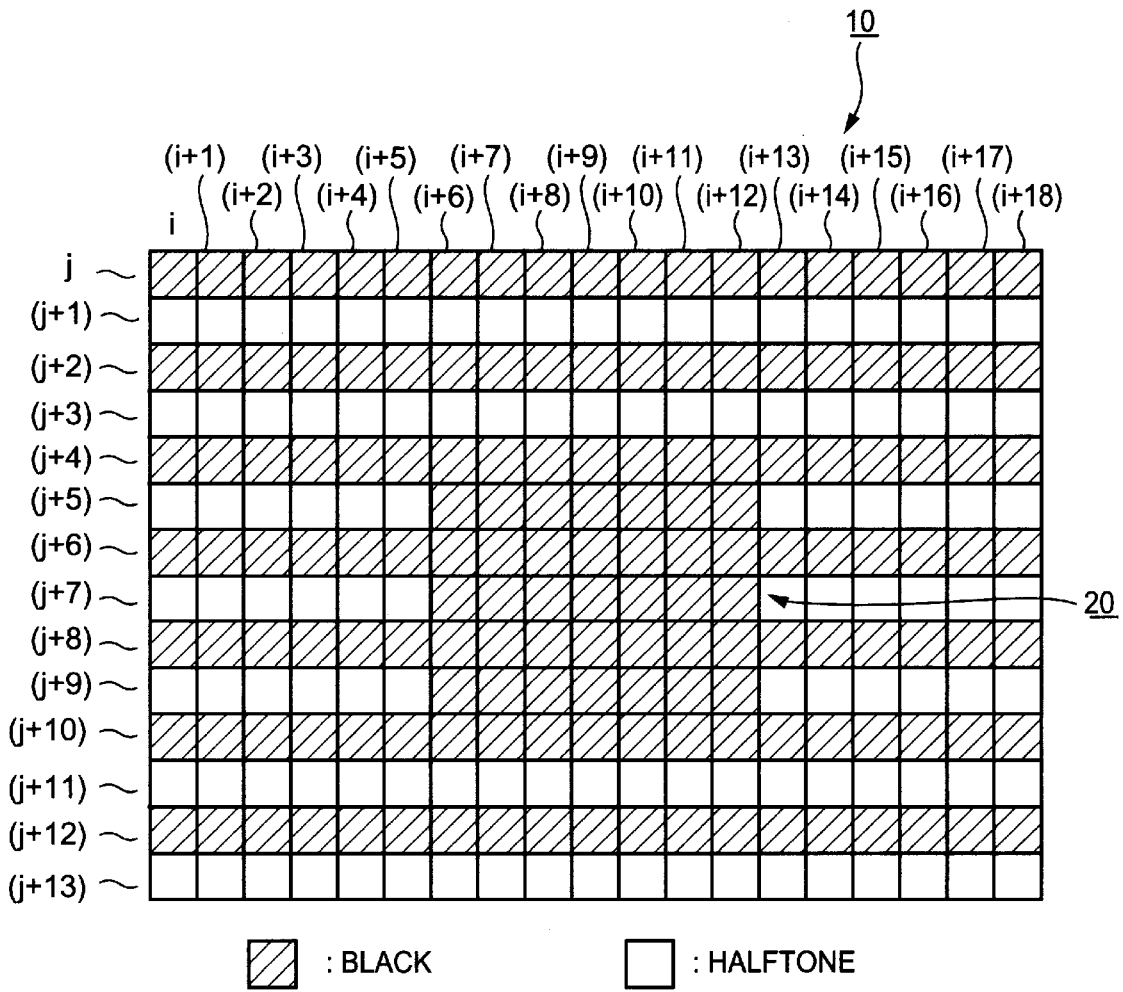
FIG. 7 is a window pattern on a black and halftone background.

Here, the emergence of a crosstalk will be explained with reference to FIGS. 7 and 8A through 8C. FIG. 7 shows a background region 10 in which black and halftone colors, for example, are alternatively displayed on every one of horizontal scanning lines j, (j+1), (j+2), ..., (j+13) and a rectangular black window region 20. Signal voltages Vsig supplied to coordinates of pixel point {(i+9), (j+1)}, for example, have waveforms shown in FIG. 8A which represents black and halftone signal voltages provided to the (i+9) column on a time sequential basis. An absolute amplitude value of the signal voltage Vsig indicates brightness of apixel. Rows (j+1), (j+3) and (j+11) have a halftone amplitude but rows other than those have a black one indicated in FIG. 8A. The driving scheme for this display is the 1H common reverse method in which a rectangular common voltage Vcom applied to the common electrode 341 of the entire pixel is alternatively changed every horizontal scanning period to either one of common voltages Vcom1 and Vcom2 as shown in FIG. 8B. The driving scheme of this sort provides the liquid crystal layer 401 with alternative voltages to avoid deterioration thereof.

For simplicity, it is assumed that common voltages Vcom1 and Vcom2 and the black and halftone voltages Vb and Vh are respectively satisfied with the following:

$$Vcom1=Vcom2=Vb=2\,Vh$$

The TFT 121 at the coordinates of pixel point {(i+9), (j+1)} turns on at timing (j+1). Further, the ratios of the parasitic capacitor Cpsig and the sum of the storage and liquid crystal capacitors Cs and CLc to the total capacitance Cpall are $\alpha$ and $\beta$, respectively. Potential fluctuations at the pixel electrode due to a change in the signal voltage Vsig and the coupling of the parasitic capacitor Cpsig are in proportion to the ratio $\alpha$ while the fluctuations due to a change of the common voltage Vcom in proportion to the ratio $\beta$. It can be also assumed:

$$\beta=(CLc+Cs)/Cpall\approx 1$$

When the TFT 121 at the pixel point {(i+9), (j+1)} turns on in response to the gate pulse supplied to the gate thereof at timing (j+1), the storage capacitor Cs and the liquid crystal capacitor CLc are provided with the signal voltage Vsig (the halftone voltage Vh) through the TFT 121. The common electrode 341 is supplied with a voltage Vcom. The voltage at the storage capacitor terminal 112 may be regarded as substantially the same as at the common electrode 341. The charging voltage V1 is given:

$$V1=Vh-(-Vcom)=(3/2)Vb$$

The voltage V1 is held in the capacitors Cs and CLc during the horizontal scanning period 1H until the TFT121 turns on in response to the next gate signal if there is no signal voltage coupling with the capacitors CLc and Cs through the TFT 121. The charging voltage, however, varies in accordance with the signal voltage coupling. At timing (j+2) a black signal voltage Vb is coupled from the signal line 103 to the common electrode 112. Since the common voltage Vcom is Vcom2 at that timing, the charging voltage V2 in the capacitors CLc and Cs is:

$$V2=Vh+\beta\times 2Vcom-\alpha\,(Vh+Vb)-Vcom=(3/2)\,(1-\alpha)Vb,$$

where $\beta=(CLc+Cs)/Cpall\approx 1$

In a similar way, the charging voltages V3 and V4 at timing (j+3) and (j+4) are, respectively, provided:

$$V3=V2-\beta\times 2Vcom+\alpha\,(Vh+Vb)-(-Vcom)=V1;\text{ and }V4=V2$$

Further, the signal voltages Vsig at timing (j+5) through (j+10) are the black voltage Vb so that the charging voltages V5 through V10 are:

$$V5=V4-\beta\times 2Vcom+\alpha\times 2Vb-(-Vcom)=Vb\{3/2+(1/2)\,\alpha\}$$

$$=V7=V9;\text{ and}$$

$$V6=V4=V8=V10$$

The following charging voltages V11 through V13 at time sequences (j+11) through (j+13) are:

$$V11=V3=V13$$

Wider solid-line waveforms in FIG. 8C indicate voltages Vp at the pixel electrode 151. The signal voltage Vsig and the charging voltages of the capacitors Cs and CLc at the coordinates of pixel point {(i+3), (j+1)}, on the other hand, are different from those shown in FIGS. 8A and 8C, respectively, because they do not have components of the window. The halftone and black voltages are alternatively supplied at the timing (j+1), (j+3), ..., (j+13) and at the timing (j+2), (j+4), ..., (j+12), respectively, after the TFT 121 at the pixel point {(i+3), (j+1)} has turned on in response to the gate pulse supplied to the gate thereof at timing (j+1). As evident from the explanation set forth above, the charging voltages at the timing (j+1), (j+2), ..., (j+13) are repeated with voltages V1 through V4. The following comparison table 1 indicates charging voltage differences between the pixel points {(i+9), (j+1)} and {(i+3), (j+1)}.

TABLE 1

| Timing: | (j+1) | (j+2) | (j+3) | (j+4) | (j+5) | (j+6) | (j+7) | (j+8) | (j+9) | (j+10) | (j+11) | (j+12) | (j+13) |
|---|---|---|---|---|---|---|---|---|---|---|---|---|---|
| w/ Window | V1 | V2 | V1 | V2 | V5 | V2 | V5 | V2 | V5 | V2 | V1 | V2 | V1 |
| w/o Window | V1 | V2 | V1 | V2 | V1 | V2 | V1 | V2 | V1 | V2 | V1 | V2 | V1 |

As evident from Table 1, the total voltage applied to the pixel points {(i+9), (j+1)} for the period (j+1) through (j+13)

is smaller than that to the pixel points {(i+3), (j+1)}. This indicates that the brightness at pixel points at the upper and lower regions of the window and/or the window itself is different from that at other regions, i.e., the crosstalk occurs at the former. A similar phenomenon happens even in the case that the common and signal voltages are in reversed phases to those described above.

As seen from an equivalent circuit of FIG. 6, pixel potentials cause level shifts synchronously in accordance with potential fluctuations at the signal line 103. The magnitude of the level shifts is in proportion to the ratio α of the parasitic capacitance Cpsig to the total capacitance Cpall. In the event that the level shifts are large, displayed images are so affected by them that crosstalk images may be visually observed.

Where the liquid crystal capacitance CLc=0.25 pF, the storage capacitance Cs=0.35 pF, the parasitic capacitance Cpsig defined between the signal line 103 and the pixel electrode is Cpsig=0.03 pF, and the parasitic capacitance Cgs=0.018 pf, the total pixel capacitance Cpall (per unit pixel) is 0.648 pF.

As described above, when a window pattern has been displayed on the central portion of the display area with a background pattern consisting of a black or halftone image alternatively displayed on pixels along every scanning line, crosstalk images have appeared at the upper and lower portions of the window pattern.

In this particular case, the ratio α of the parasitic capacitance Cpsig defined between the signal line 103 and the pixel electrode 151 to the total capacitance Cpall (Cpsig/Cpall) has been 4.6%. The inventors of this application have studied the relationship between the ratio and the crosstalk and eventually discovered that no crosstalk images are visually observed at a certain value of the ratio or less. Their experimental result has revealed that the value is 4% or less when no crosstalk images are visually recognized.

They have changed the structure of pixel electrode portions to improve crosstalk characteristics. In order to shield electric flux lines between the signal line 103 and the transparent pixel electrode 151, the branch portion 161a of the storage capacitor line 161 has a length "L" overlapped with the side edge of the pixel electrode 151.

As a result, the parasitic capacitance Cpsig reduces from 0.03 pF to 0.02 pF because the parasitic capacitance with the overlapped portion 161a is 0.1 times that of the case of none of the portion 161a being as described above. In addition, the storage capacitance Cs increases from 0.35 pF to 0.4 pF. The ratio a of the parasitic capacitance Cpsig defined by the signal line 103 and the pixel electrode 151 to the total pixel capacitance Cpall becomes decreasingly 2.9% so that no crosstalk images are visually observed.

In this embodiment, the area where the side edge of the pixel electrode 151 is overlapped with the pattern of the storage capacitor line 161, and the storage capacitance Cs are increased so that the ratio α of the Cpsig defined by the signal line 103 and the pixel electrode to the total pixel capacitance Cpall is suppressed to 4% or less. However, this invention is not limited to that embodiment as other measures for reduction of the ratio are available. The distance S between the signal line 103 and the pixel electrode 151, for instance, may be increased to make the ratio α of Cpsig/Cpall 4% or less. The increase of the storage capacitor Cs also makes the ratio of Cpsig/Cpall 4% or less. Alternatively, the liquid crystal capacitance defined by the pixel electrode 151 and the counter electrode 341 between which the liquid crystal layer 401 is held may be increased to make the ratio α of Cpsig/Cpall 4% or less.

As set forth above, according to the present invention, the parasitic capacitance between the pixel electrode and the signal line is suppressed to be 4% or less of the total capacitance so that potential fluctuations at the signal line provided through the parasitic capacitance cause very little potential level shifts at the pixel electrode. As a result, even when a window pattern is displayed on the center of a panel with a background pattern alternatively consisting of black and halftone pixel images every scanning line, no substantial crosstalk images occur at the upper and lower portions of the window so that an AM LCD is provided with a high dignity display.

What we claim is:

1. An active-matrix type liquid crystal display device comprising:

an array substrate, said array substrate including:
an insulation substrate;
pixel electrodes formed on said insulation substrate;
signal lines provided on said insulation substrate;
scanning lines crossing said signal lines;
transistors provided in the vicinities where said signal lines cross said scanning lines, said transistors including source, drain, and gate electrodes;
said pixel electrodes being connected between said transistors and a reference potential point; and
storage capacitor lines; and a counter substrate provided opposite to said array substrate, said counter substrate including a counter electrode; and a liquid crystal layer held between said pixel and counter electrodes;

wherein said pixel electrodes and storage capacitor lines are provided to define storage capacitance Cs;

said counter electrodes, said pixel electrodes, and said liquid crystal layer define liquid crystal capacitance CLc;

said signal lines and pixel electrodes define parasitic capacitance Cpsig;

said gate and source electrodes define parasitic capacitance Cgs; and a ratio of the parasitic capacitance Cpsig to the total capacitance Cpall consisting of the sum of (i) the storage capacitance Cs, (ii) the liquid crystal capacitance CLc, (iii) the parasitic capacitance Cpsig and (iv) the parasitic capacitance Cgs, is 4% or less.

2. The active-matrix type liquid crystal display device according to claim 1, wherein potentials applied to said counter electrode and said storage capacitors are changed every scanning line in polarity with respect to a reference potential so that potentials applied to said liquid crystal layers are changed every scanning line in polarity with respect to the reference potential.

3. The active-matrix type liquid crystal display device according to claim 1, wherein said storage capacitor lines are further provided with patterns overlapped with the side edge of said pixel electrodes so that the ratio (Cpsig/Cpall) of the parasitic capacitance Cpsig to the total capacitance Cpall is 4% or less.

4. The active-matrix type liquid crystal display device according to claim 1, wherein a distance between said signal line and said pixel electrode is set to make the ratio of the parasitic capacitance Cpsig to the total capacitance Cpall, 4% or less.

* * * * *